US005566067A

United States Patent [19]

Hobson et al.

[11] Patent Number: 5,566,067

[45] Date of Patent: Oct. 15, 1996

[54] EYELID VIGILANCE DETECTOR SYSTEM

[75] Inventors: J. Alan Hobson, Brookline; Robert A. Stickgold, Cambridge, both of Mass.

[73] Assignee: The President and Fellows of Harvard College, Cambridge, Mass.

[21] Appl. No.: 410,125

[22] Filed: Mar. 23, 1995

[51] Int. Cl.[6] .......................... G01S 13/74

[52] U.S. Cl. .......................... 364/419.2; 340/575

[58] Field of Search .......................... 364/569, 419.2, 364/550, 551.01; 340/575, 825.06, 825.15; 128/639, 640, 653.5

[56] References Cited

U.S. PATENT DOCUMENTS

| | | | |
|---|---|---|---|
| 3,689,135 | 9/1972 | Young et al. | 351/39 |
| 3,863,243 | 1/1975 | Skolnick et al. | 340/279 |
| 4,144,531 | 3/1979 | Anbergen | 340/575 |
| 4,359,724 | 11/1982 | Zimmerman et al. | 340/575 |
| 4,524,776 | 6/1985 | Withers et al. | 128/644 |
| 4,585,011 | 4/1986 | Broughton et al. | 128/733 |
| 4,836,219 | 6/1989 | Hobson et al. | 128/782 |
| 4,953,111 | 8/1990 | Yamamoto et al. | 364/569 |
| 4,967,186 | 10/1990 | Ludmirsky et al. | 340/575 |
| 5,137,345 | 8/1992 | Waldorf et al. | 351/206 |
| 5,402,109 | 3/1995 | Mannik | 340/575 |

*Primary Examiner*—Emanuel T. Voeltz
*Assistant Examiner*—Thomas Peeso
*Attorney, Agent, or Firm*—Wolf, Greenfield & Sacks, P.C.

[57] ABSTRACT

A vigilance monitoring system and method provides an alarm signal to a subject at an early stage of vigilance loss. The system includes a sensor, preferable made from a piezoelectric material, attached to the eyelid of the subject, that produces an electric signal in response to each eyelid movement, wherein the strength of the signal depends on the magnitude of the eyelid movement. A processor, electrically coupled to the sensor, monitors the frequency of electric signals received having a signal strength above a threshold level corresponding to a small active eyelid movement, and produces an output signal if the frequency of received electric signals having the signal strength above the threshold level is less than a predetermined frequency. The output signal preferably includes an audio alarm signal provided to an output loudspeaker. The processor preferably includes a signal recording circuit and a programmable microprocessor, wherein the signal recording circuit is electrically connected to the sensor and/or the microprocessor.

14 Claims, 4 Drawing Sheets

EYELID VIGILANCE DETECTOR SYSTEM

FEDERALLY SPONSORED RESEARCH

This invention was made with government support under Grant Number MH44823 awarded by the National Institutes of Health. The United States government has certain rights in the invention.

FIELD OF THE INVENTION

The present invention relates to vigilance detection systems and methods and, more particularly, to a system and method for accurately detecting vigilance loss of a subject at an early stage thereof by monitoring the frequency of small active eyelid movements of the subject.

BACKGROUND OF THE INVENTION

Many safety-related casualties and mishaps are caused by persons falling asleep while performing various tasks. For example, a large number of automobile accidents are caused by persons falling asleep while driving. A need therefor exists for a safety system that accurately monitors the vigilance (alertness) of a person and provides a warning to awaken that person at an early stage of vigilance loss.

The need for such a system has been recognized as numerous attempts have been made at designing an effective vigilance detection and warning system. None of the vigilance detection systems to date, however, accurately detects vigilance loss at a sufficiently early stage thereof to prevent safety-related casualties. The systems also suffer from other less serious drawbacks.

U.S. Pat. Nos. 3,863,243 (Skolnick et al.), 4,144,531 (Anbergen) and 4,953,111 (Yamamoto et al.) disclose prior art vigilance detection systems that employ an optical/electrical circuit for detecting eyelid movement. All of the disclosed systems optically monitor the frequency of complete eyelid closures or blinks; the Skolnick and Yamamoto systems do so directly while the Anbergen system does so indirectly by detecting eyelash movements. The disclosed systems are ineffective at providing a warning signal at an early stage of vigilance loss because the systems provide a warning signal only after a predefined threshold time period without a blink, which typically occurs at a relatively late stage of vigilance loss. In addition, such systems require the subject to wear glasses or goggles to carry the delicate optical circuitry. If the glasses or goggles are not precisely placed on the subject, then faulty operation may result.

Another prior art system includes a light-weight plastic head-piece that is placed on the head of a subject being monitored and provides an audio alarm signal to awaken the subject in response to significant radial head movements from a predefined alert state orientation, such as head nods. The head-piece system also is ineffective at warning the subject at an early stage of vigilance loss because head nods typically occur at a relatively late stage of vigilance loss. The head-piece system suffers from the additional drawback that voluntary radial head movements can falsely trigger the device to provide an alarm signal.

A further prior art system, described in U.S. Pat. No. 4,359,724 (Zimmerman), monitors the frequency of significant eyelid movements (i.e., blinks) of a subject. The Zimmerman system includes EMG electrodes that are placed on the eyelids of a subject and produce an electric signal in response to each significant eyelid movement. Analog circuitry, electrically connected to the sensors, includes a timer that is reset each time an electric signal is received. If the timer is not reset within a certain time period, then an audio alarm signal is provided to awaken the subject. Like the prior art optical systems, the Zimmerman system similarly monitors the frequency of blinks and therefore also is incapable of alarming a subject at an early stage of vigilance loss. The Zimmerman system additionally suffers from the drawbacks that EMG sensors are bulky and cumbersome and require precise placement for accurate operation.

Accordingly, a general object of the present invention is to provide a simple yet accurate system and method for monitoring the vigilance of a subject that detects vigilance loss at an early stage thereof.

SUMMARY OF THE INVENTION

Eyelid movements generally fall into three categories: (1) "large active" or significant eyelid movements such as blinks; (2) "small active" eyelid movements which are substantially less significant movements than large active eyelid movements; and (3) "passive" eyelid movements, which are less significant movements than small active movements and which are caused by movements of the eyeball underneath the eyelid. Small active eyelid movements are caused by involuntary twitches of the eyelid muscle when the muscle maintains the eyelid open in response to neuronal signals received from the brain.

It is known that vigilance is related to the frequency of large active eyelid movements. Applicants have discovered through clinical studies that vigilance also is related to the frequency of small active eyelid movements. It additionally has been determined that a decrease in the frequency of small active eyelid movements occurs at an earlier stage of vigilance loss than does a decrease in the frequency of large active eyelid movements.

The drawbacks of the prior art are overcome by a vigilance monitoring system of the present invention that provides an alarm signal to a subject at an early stage of vigilance loss. The system includes a sensor, preferably a piezoelectric sensor, that is attached to the eyelid of a subject and that produces an electric signal in response to each eyelid movement. The strength of the signal depends on the magnitude of the eyelid movement. A processor, electrically coupled to the sensor, monitors the frequency of electric signals received having a signal strength above a threshold level corresponding to a small active eyelid movement. The processor produces an output signal if the frequency of received electric signals having the signal strength above the threshold level is less than a predetermined frequency.

In the preferred embodiment of the present invention, the output signal includes an audio alarm signal provided to an output loudspeaker.

The processor preferably includes a signal recording circuit and a programmable microprocessor, wherein the signal recording circuit is electrically connected between the sensor and the microprocessor. The signal recording circuit preferably includes an analog peak detection circuit, a comparator, and a short term event buffer. The analog peak detection circuit is coupled to the sensor and stores the highest strength electric signal received during each predetermined time period. The comparator is coupled to the peak detection circuit and compares the highest strength electric signal to a threshold level signal during each predetermined time period. The short term event buffer is coupled to the comparator and has a number of address locations, each address location corresponding to a separate time period and temporarily storing a number (i.e., a digital bit) representing whether an electric signal having the signal strength greater than the threshold level was received during the corresponding time period.

The microprocessor preferably is programmed to produce a first output signal if the frequency of received signals having the signal strength is less than a first predetermined frequency and to produce a second output signal if the frequency of received signals having the signal strength is less than a second predetermined frequency.

According to another embodiment of the present invention, a method for monitoring the vigilance of a subject includes the following steps: using a sensor, preferably piezoelectric, attached to the eyelid of the subject, to produce an electric signal in response to each eyelid movement, wherein the strength of the signal depends on the magnitude of the eyelid movement; monitoring the frequency of electric signals produced having a signal strength above a threshold level corresponding to a small active eyelid movement; and producing an output signal if the frequency of produced electrical signals having the signal strength is less than a predetermined frequency.

The step of producing an output signal preferably includes producing an audio alarm signal if the frequency of produced electric signals having the signal strength is less than a predetermined frequency.

The step of monitoring the frequency of electric signals produced preferably includes the steps of: storing the highest strength signal produced during each predetermined time period; comparing the highest strength signal to a threshold level signal during each predetermined time period; and temporarily storing a number in each of a certain number of addressed buffer locations representing whether a signal having the signal strength was produced during a corresponding time period.

The step of producing an output signal preferably includes the steps of: producing a first output signal if the frequency of produced signals having the signal strength is less than a first predetermined frequency; and producing a second output signal if the frequency of produced signals having the signal strength is less than a second predetermined frequency.

BRIEF DESCRIPTION OF THE DRAWINGS

The foregoing and other objects and advantages of the invention will become more clear after a reading of the following detailed description of the preferred embodiment and brief description of the drawings in which.

DETAILED DESCRIPTION

Clinical studies were conducted by Applicants on a subject over a 3½ day period including three nights, of which the subject did not sleep during one of the three nights. During the second of the three nights, the subject attempted to remain awake through the night. The subject performed cognitive tests in two categories while reaction times, performance (in terms of cognitive errors) and eyelid movements (including small active movements) were monitored. While the eyelid movements monitored included both large active and small active eyelid movements, the majority of the movements were small active movements and are referred to as such hereinafter. The results showed an increase in reaction time and error percentage and a decrease in small active eyelid movement frequency during the period of sleep deprivation and decreased vigilance.

The testing was performed using the following equipment: a piezoelectric sensor was adhesively attached to the eyelid of the subject and a processor monitored eyelid movements above a threshold strength (i.e., movements that produced an electric signal having an analog voltage level above 0.5 mV). Reaction times were tested on a Macintosh™ personal computer.

Figure 1A:
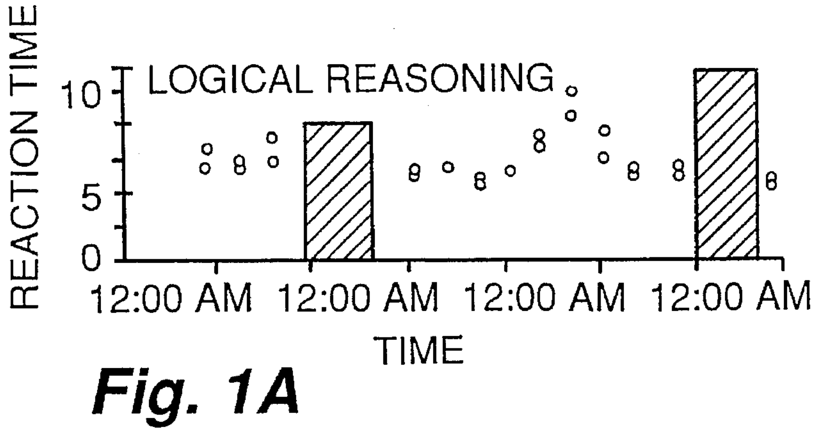
FIGS. 1(*a*) and 1(*b*) are graphs showing reaction times of a subject who performed cognitive tests during periods of sufficient sleep and periods of sleep deprivation.
Figure 1B:
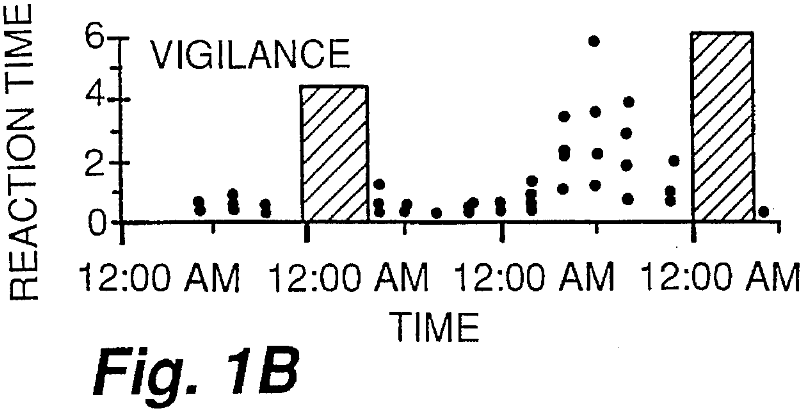

FIGS. 1(*a*) and 1(*b*) are graphs showing the reaction times of the subject over the 3 ½ day period during performance of logical reasoning and cognitive tests (FIG. 1(*a*)) and vigilance cognitive tests (FIG. 1(*b*)), both of which are interactive computer tests. The reaction times are shown in seconds on the vertical axis while the time in hours is shown on the horizontal axis. The gray shaded areas denote periods of sleep. Each dot on the graphs represents an average reaction time of the subject.

As shown in FIG. 1(*a*), the reaction times of the subject during the logical reasoning test were fairly consistent within the approximate range of 6–8 seconds over the 3½ day period except between 10 a.m. and 2 p.m. on the second day, after missing a full night sleep during the previous night. During this period of sleep deprivation, the reaction times were elevated and fell within the approximate range of 8–10 seconds indicating a state of decreased cognitive performance (at an early stage of vigilance loss—before a sleeping state).

Similarly, as shown in FIG. 1(*b*), the reaction times of the subject during the vigilance tests were fairly consistent within the approximate range of 0.25–1.5 seconds over the 3 ½ day period except during the same period between 10 a.m. and 4 p.m. During this period of sleep deprivation, the reaction times were elevated and fell within the approximate range of 1.5–6 seconds evidencing a state of decreased vigilance (at an early stage of vigilance loss). These graphs illustrate the known result that cognitive performance efficiency and vigilance suffer during periods of sleep deprivation.

Figure 2A:
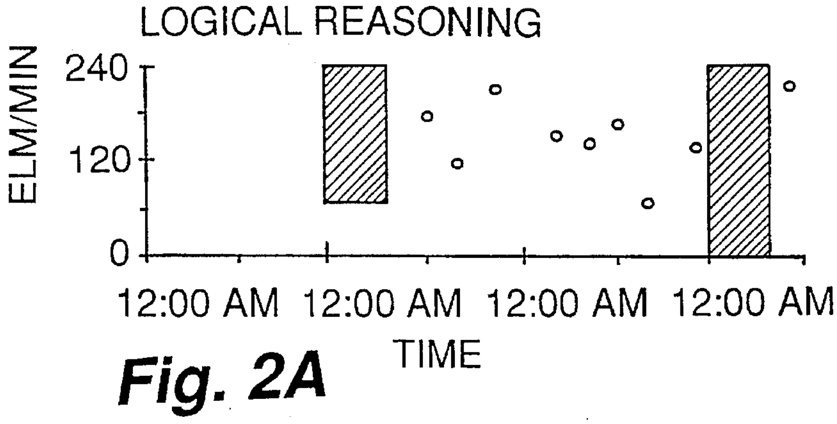
FIGS. 2(*a*) and 2(*b*) are graphs showing the frequency of eyelid movements of the subject during the cognitive tests associated with FIGS. 1(*a*) and 1(*b*)
Figure 2B:
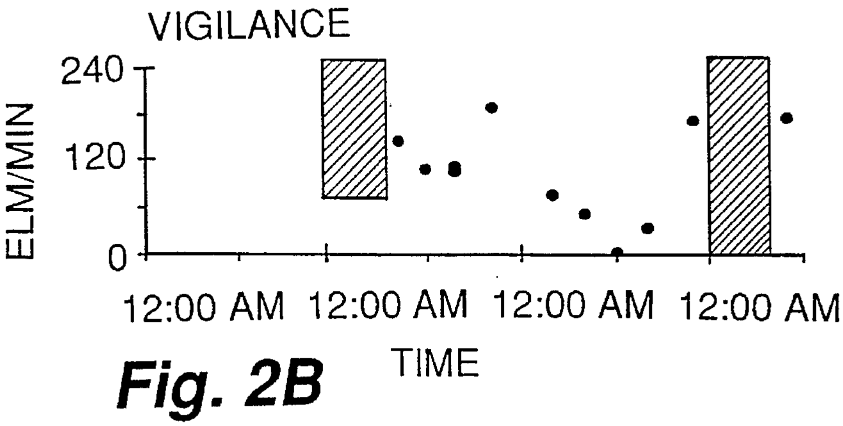

FIGS. 2(*a*) and 2(*b*) are graphs respectively showing the mean eyelid movements (ELMs) (including predominantly small active movements) per minute of the subject over the 3½ day period during the respective performance of the logical reasoning and cognitive vigilance tests. The vertical axis of the graphs shows the mean eyelid movements per minute and the horizontal axis of the graphs shows the time period in hours.

As shown in FIG. 2(*a*), the mean eyelid movements per minute are fairly erratic over the 3½ day time period. Nonetheless, a significant decrease in the eyelid movement activity can be seen during the period of sleep deprivation and decreased vigilance. FIG. 2(*b*) similarly shows that the mean eyelid movements per minute are somewhat erratic over the 3½ day time period but clearly shows a decrease in the eyelid movement activity during the same period of sleep deprivation and decreases vigilance. Thus, as illustrated in FIGS. 2(*a*) and 2(*b*), the frequency of small active eyelid movements clearly decreases as a subject's vigilance decreases.

Figure 3A:
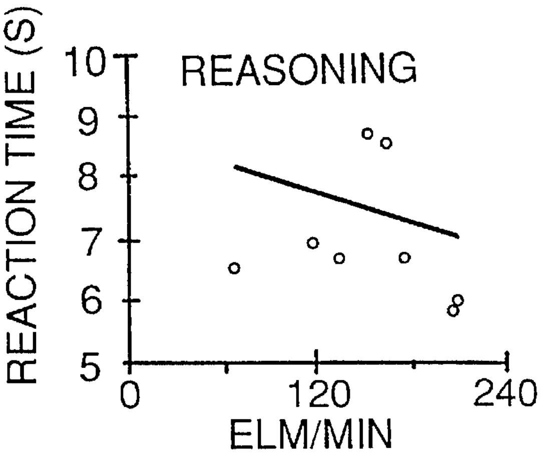
FIGS. 3(*a*) and 3(*b*) are graphs showing the relationship between reaction times and eyelid movement frequency of the subject during the cognitive tests.
Figure 3B:
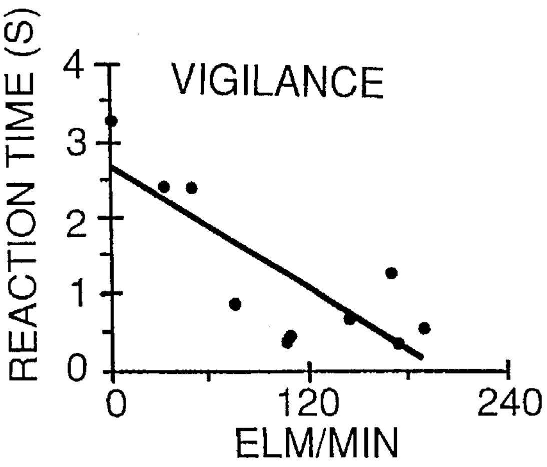

FIGS. 3(*a*) and 3(*b*) are graphs showing the relationship between the reaction times and the eyelid movements frequency of the subject during respective performances of the logical reasoning and cognitive vigilance tests. As shown, the reaction times are inversely proportional to the frequency of small active eyelid movements. Because decreased cognitive performance efficiency is known to result from decreased vigilance (at an early stage thereof), these graphs illustrate that a decrease in small active eyelid movement frequency is an early indicator of vigilance loss.

Figure 4A:
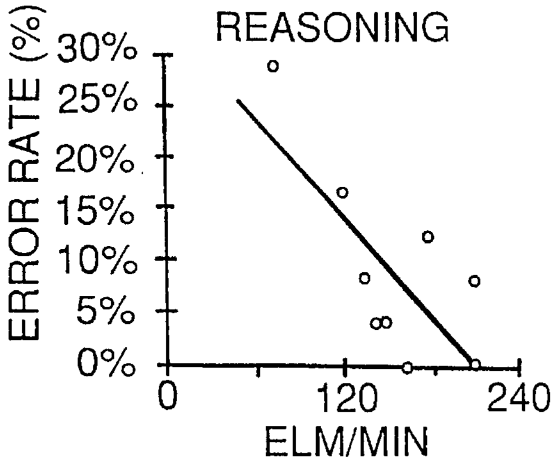
FIGS. 4(*a*) and 4(*b*) are graphs showing the relationship between cognitive errors and eyelid movement frequency of the subject during the cognitive tests.
Figure 4B:
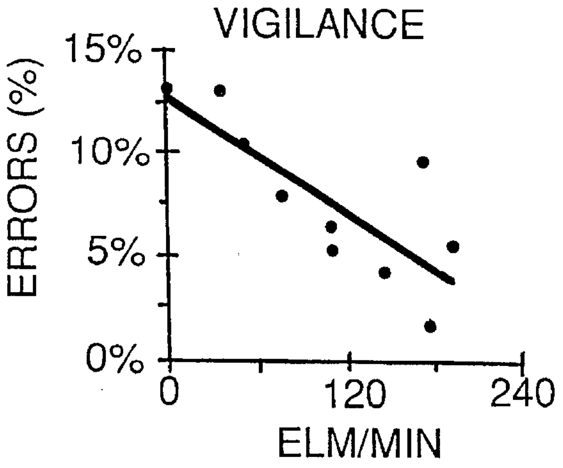

FIGS. 4(*a*) and 4(*b*) are graphs showing the relationship between the performance (in terms of percentage of errors) of the subject and the frequency of eyelid movements of the subject during respective performances of the logical reasoning and cognitive vigilance tests. As clearly shown, the percentage of cognitive errors is inversely proportional to the frequency of small active eyelid movements. These graphs further illustrate that decreased small active eyelid movement frequency is an early indicator of vigilance loss.

Figure 5:
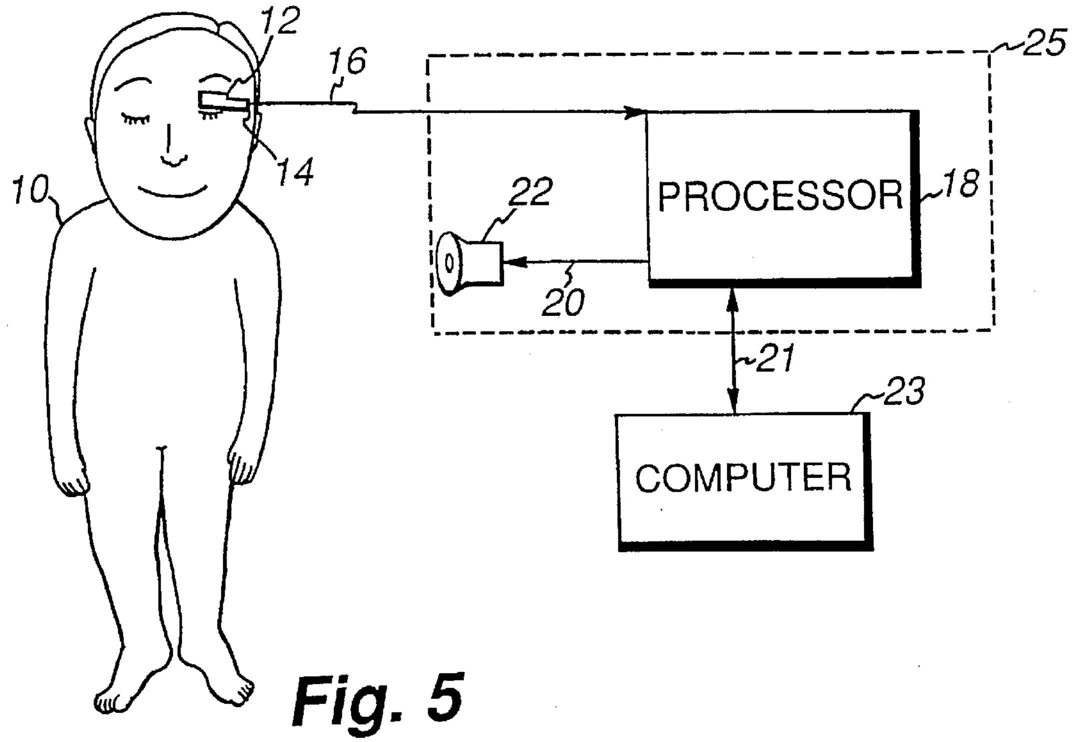
FIG. 5 is a general block diagram of the vigilance monitoring system of the present invention.

The present invention includes a system and method for monitoring the vigilance of a subject and for providing an output signal (i.e., for alarming the subject) at an early stage of vigilance loss by monitoring the frequency of small active eyelid movements. FIG. 5 is a general block diagram of the vigilance monitoring system of the present invention shown used on a subject 10. As shown, the system includes a sensor 12, preferably adhesively attached to the eyelid of the subject 10, and electrically connected through a connector 14 to a shielded wire 16. The sensor 12 preferably is a piezoelectric sensor and is commercially available under the name Nightwatch™ eye sensor from Healthdyne Technologies company of Marietta, Ga. As will be understood by those skilled in the art, the piezoelectric sensor generates an analog voltage in response to mechanical force or deformation of the sensor. Deformation of the sensor is caused by movement of the eyelid. The amplitude of the voltage generated depends on the strength of the eyelid movement, wherein a stronger eyelid movement causes the provision of a greater amplitude voltage.

An electric signal, corresponding to the analog voltage generated, is provided along wire 16 to a processor 18. The processor 18 monitors the frequency of electric signals received having a signal strength (voltage amplitude) above a threshold voltage level corresponding to a small active eyelid movement. The threshold voltage can be preprogrammed and can depend on a group of subjects. The threshold voltage has a typical value of 0.5 millivolts. The processor preferably is programmed to produce an output signal if the frequency of the received electric signals having a signal strength above the threshold level (corresponding to small active eyelid movements) is less than a predetermined frequency. This frequency can be preprogrammed and can depend on the subject. A typical cut-off frequency that triggers an alarm is 20 eyelid movements per 10 seconds. This output signal can be in the form of an audio alarm signal provided along line 20 to output loudspeaker 22. The processor 18 and output loudspeaker 22 can be enclosed in a conventional box 25 small enough to be held. Processor 18 also may be connected by bus (cable) 21 to an external computer 23 for recording and processing information such as the frequency and strength of electric signals as well as the output signals provided.

As will be explained in greater detail below, the processor can be programmed to produce a number of different output signals if certain criteria are met. For example, the processor can be programmed to produce a first output signal, such as an audio alarm signal, if the frequency of received signals having a signal strength above the predetermined threshold level is less than a first predetermined frequency and to produce a second output signal, similar to or different from the first output signal, if the frequency of received signals having a signal strength above the predetermined threshold level is less than a second predetermined frequency. The output signals can be audio alarm signals, signals sent to a central headquarters or to an external computer, or other. It should be understood that any number of different output signals of different types can be provided if certain predetermined criteria (including criteria associated with the frequency and strength of the received signals) are met.

Figure 6:
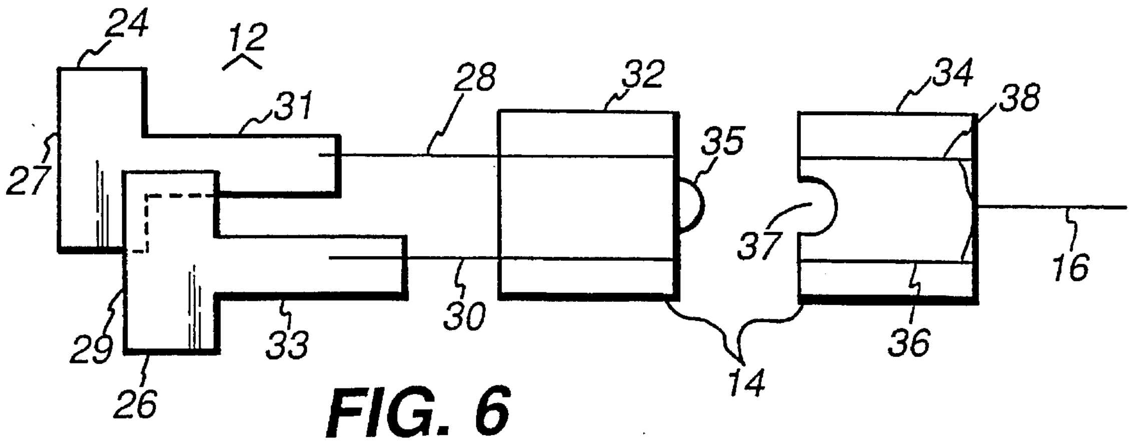
FIG. 6 is a partially exploded, partially schematic diagram of the piezoelectric sensor and attached wiring arrangement preferably used with the system of the present invention.

FIG. 6 is a partially exploded, partially schematic diagram of the piezoelectric sensor and connector arrangement of the preferred embodiment of the present invention. As shown, the piezoelectric sensor 12 includes two strips 24 and 26 of piezoelectric film material which are adhesively attached to one another in an electrically differential arrangement. The strips 24 and 26 include respective eyelid mounting rectangles 27 and 29 and strip portions 31 and 33. The strip portions 31 and 33 are physically spaced and electrically insulated from one another. The strip portions 31 and 33 are physically and electrically connected to conductive pins 28 and 30 of connector 32.

Connector 32 preferably is a conventional two-pin electrical connector having a male-type connector end 35. Connector 32 mates with corresponding two-pin connector 34 of the female-type. End 35 of male-type connector 32 is inserted within opening 37 of female-type connector 34 and a spring-biased lip (not shown) on the male-type connector is biased against a shoulder (not shown) on the female-type connector for maintaining the connectors in releasable interengagement. While the connectors are interengaged, pin 38 of connector 34 is electrically tied to pin 28 of connector 32 and pin 36 of connector 34 is electrically tied to pin 30 of connector 32. Connectors 32 and 34 may be conventionally disconnected from one another by depressing the lip. Pins 36 and 38 are electrically tied to the wire(s) (not shown) within shielded cable 16. As will be readily understood by those skilled in the art, the sensor 12 produces a differential voltage that is carried by pins 28 and 30 and 34 and 36 to the wire(s) within shielded cable 16.

Either one sensor (placed on one eyelid) or two sensors (one placed on each eyelid) can be used with the system of the present invention. One surface of the eyelid mounting rectangle of the piezoelectric sensor preferably is placed on the eyelid of a subject between the eyelash and eyebrow. The piezoelectric sensor film is very lightweight and is not cumbersome for the user 10. The sensor also is sufficiently sensitive to produce detectible output voltages in response to small active eyelid movements. The sensor preferably is attached using adhesive and can include an adhesive backing that is exposed by peeling away a laminate layer from one surface of the rectangle portion 27 or 29 of the sensor 12. The rectangle portion 27 or 29 of the sensor 12 preferably falls within the size range of 1 by 4 mm to 3 by 12 mm. While use of a piezoelectric sensor is preferable, other sensors that are sensitive enough to produce accurate and detectible electric signals in response to small active eyelid movements are suitable.

Figure 7:
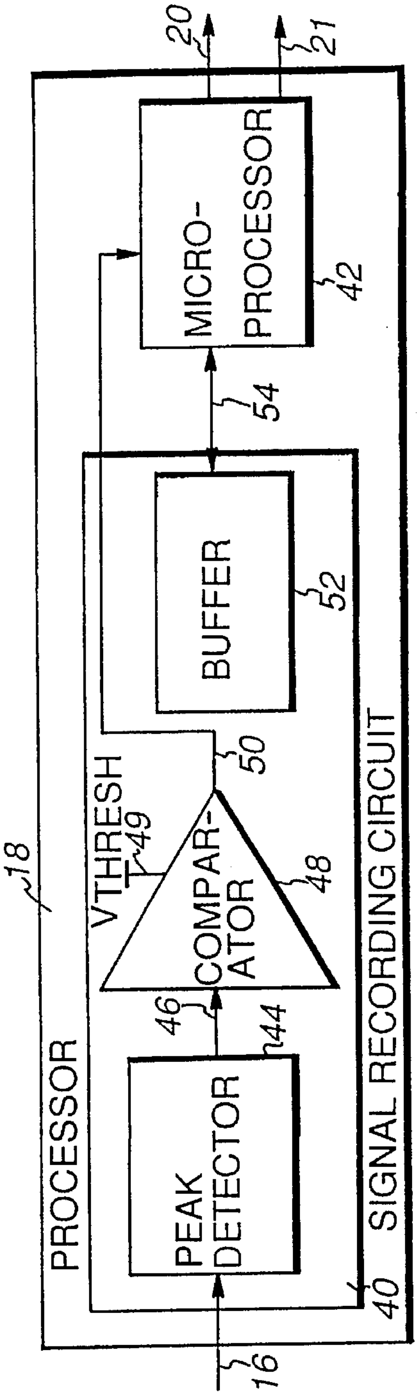
FIG. 7 is a detailed block diagram of the vigilance monitoring system of the present invention.

FIG. 7 is a detailed block diagram of the processor 18 of the vigilance detection system of the present invention. As shown, the processor 18 includes a signal recording circuit 40 and a microprocessor 42. The signal recording circuit 40 samples the electric signals, representing eyelid movements, received on line 16 during each predefined time period, preferably 250 ms. The signal recording circuit then compares any electric signals received during that time period to a threshold voltage corresponding to a minimum small active eyelid movement recognized by the system. This threshold voltage typically is equal to 0.5 mV. The circuit then stores, for each time period (of the same duration), a number representing whether an electric signal exceeding the threshold voltage was received. Thus, the signal recording circuit sequentially stores numbers representing whether at least a small active eyelid movement occurred during each 250 ms period of time. This stored information can be accessed by microprocessor 42 through bus 54. Microprocessor 42 is programmed to monitor the stored information and to provide at least one output signal if the frequency of received signals above the threshold voltage is less than a predefined frequency for a predetermined period of time.

The signal recording circuit 40 preferably includes a peak detection circuit 44, a comparator 48 and a short term buffer 52. Peak detect circuit 44 preferably is an analog circuit that stores the peak analog voltage or signal received on line 16 from sensor 12 during the predetermined time period (i.e., 250 ms). As will be understood by those skilled in the art, the peak detect circuit 44 can be implemented with analog circuitry elements such as diodes and capacitors. Alternatively, peak detect circuit 44 can be implemented with digital circuitry that samples the received electrical voltages and stores a digital word representing the highest of such voltages.

After each predetermined time period, the peak voltage stored by peak detect circuit 44 is output on line 46 to comparator 48 and peak detect circuit 44 is reset. Comparator 48 compares the received analog voltage to threshold voltage Vthresh that is input on line 49. The threshold voltage Vthresh is a predetermined voltage that represents the smallest amplitude voltage corresponding to a minimum small active eyelid movement that the system will recognize. The threshold voltage Vthresh can be computed during clinical studies performed on several or a single subject and can be input to the system prior to use by a clinician.

Comparator 48 compares the received peak voltage to the threshold voltage Vthresh each predetermined time period and outputs a binary number (digital sample) on line 50 to microprocessor 42 which, in turn, provides that binary number on bus 54 to short term buffer 52. The digital output of the comparator preferably is equal to binary one if the peak voltage is greater than or equal to the threshold voltage Vthresh and is equal to binary zero if the peak voltage is less than the threshold voltage Vthresh. Those skilled in the art will understand that because comparator 48 receives an analog voltage and produces a digital output, it can be implemented simply using an operational amplifier arranged as a comparator or a transistor circuit, for examples.

Short term buffer is a memory array of a finite length having a number of addressed locations. Each addressed location corresponds to a different predetermined time period (250 ms, for example). The binary outputs of comparator 48 are sequentially written to different address locations of short term buffer 52. Each binary output is written to a unique location during a separate predetermined time period.

Figure 8:
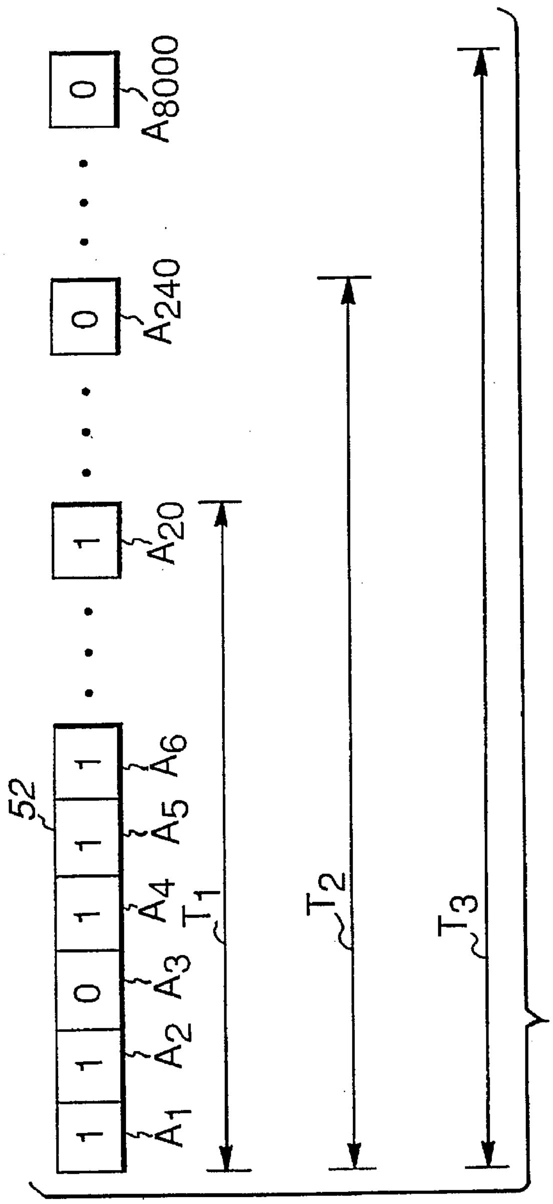
FIG. 8 is a detailed diagram illustrating the short-term buffer of the detection circuitry of the present invention.

FIG. 8 shows short term buffer 52 including a finite number (8K in this example) of addressed locations, labeled A1–A8K (only a certain number of the 8K addressed locations are shown in FIG. 8 for convenience). During each predetermined time period, the output of comparator 48 is written to an addressed location of short term buffer so that short term buffer is sequentially filled. Because short term buffer is of a finite length, the short term buffer preferably is a FIFO (first in/first out) buffer. In other words, when the buffer is completely full, during the next predetermined time period, the number stored in the first address location (that is, the number written least recently) will be replaced by the next written number.

If the predetermined sampling time period is equal to 250 ms, for example, then 20 address locations A1–A20 will store the binary information output from comparator 48 over a five second period. Similarly, 240 address locations of the buffer will store information over a 60 second period. All addressed locations of the buffer, if the buffer is 8K bits long, will be filled over a 33.33 minute time period in this example.

Microprocessor 42 can access short term buffer 52 through bus 54, preferably using a pointer system, as will be understood by those skilled in the art. Microprocessor 42 preferably is programmed to monitor the frequency of electrical signals received having a voltage value greater or equal to the threshold voltage level. Microprocessor 42 preferably monitors the frequency by counting the number of stored binary ones over a predetermined time period. As will be understood by those skilled in the art, the arithmetic logic unit (not shown) of the microprocessor performs the mathematical counting operation.

As an example, microprocessor 42 can monitor the frequency of occurrences of received voltages corresponding to small active and large active eyelid movements within a five second time period by counting the number of ones stored in short term buffer within memory locations A1–A20. Microprocessor can be programmed to output a particular output signal if the number of ones during this time period T1 falls below a certain number. For example, microprocessor 42 can be programmed to monitor the frequency of small active and large active eyelid movements and provide an audio alarm signal along line 20 if less than five movements in total occur over a five second period. In the particular example shown in FIG. 8, six binary ones are stored in memory locations A1–A20 and, therefore, no audio alarm signal would be provided.

Microprocessor 42 can be programmed to monitor the frequency of occurrences of eyelid movements over multiple different time periods. Therefore, for example, in addition to monitoring the frequency of occurrences of eyelid movements over time period T1 (five seconds), microprocessor 42 also can be programmed to monitor the frequency of occurrences of eyelid movements over time period T2 (in this example, 60 seconds). If the frequency of occurrences of eyelid movements (corresponding to the number of ones stored, for example, within address locations A1–A240 of short term buffer) is less than a certain pre-programmed number within the time period T2 (one minute), then microprocessor can provide a second output signal, such as an audio alarm or other signal.

As will be appreciated by those skilled in the art, microprocessor 42 can be programmed to monitor the frequency of occurrences of eyelid movements over any number of different time periods within the finite range of the short term buffer and can provide different output signals depending on the frequency found. The frequencies and time periods can be determined during clinical studies on several or a single subject and input to the system before use. The programmed frequencies and time periods programmed to trigger output signals may correspond to different stages of vigilance loss.

It will be understood by those skilled in the art that various changes and modifications to the embodiments shown in the drawings and described above can be made within the scope of the invention. For example, the particular circuitry for receiving the electrical signal has been described as analog circuitry. It should be understood that digital circuitry would also be suitable for such purpose. Additionally, short term buffer 52 was shown and described as a finite length digital buffer. Other memory storage elements would be suitable. Any type of output signal provided by microprocessor including, but not limited to, audio alarm signals, signals provided to a central computer, signals provided to a distant headquarters or monitoring area, or other, would be suitable. The microprocessor 42 is adaptable and programmable.

In addition, while the sensor shown and described included a piezoelectric film, any other sensor that is capable of producing accurate and detectible voltages in response to small active eyelid movements is suitable. Accordingly, the foregoing is intended only by way of example and should not otherwise limit the scope of the invention. Rather, these and all other equivalents are expected to be encompassed by the following claims.

What is claimed is:

1. A vigilance monitoring system comprising:

a sensor, attached to the eyelid of a subject, that produces an electric signal in response to each eyelid movement, wherein the strength of the signal depends on the magnitude of the eyelid movement; and a processor, electrically coupled to the sensor, that monitors the frequency of electric signals received having a signal strength above a threshold level corresponding to a small active eyelid movement, and produces an output signal if the frequency of received electric signals having the signal strength is less than a predetermined frequency.

2. A vigilance monitoring system as claimed in claim 1 wherein the sensor is made from a piezoelectric material.

3. A vigilance monitoring system as claimed in claim 1 wherein the output signal includes an audio alarm signal provided to an output loudspeaker.

4. A vigilance monitoring system as claimed in claim 1 wherein the processor includes a signal recording circuit and a programmable microprocessor, the signal recording circuit being electrically connected between the sensor and the microprocessor.

5. A vigilance monitoring system comprising:

a sensor, attached to the eyelid of a subject, that produces an electric signal in response to each eyelid movement, wherein the strength of the signal depends on the magnitude of the eyelid movement; and a processor, electrically coupled to the sensor, that monitors the frequency of electric signals received having a signal strength above the threshold level corresponding to a small active eyelid movement, and produces an output signal if the frequency of received electric signals having the signal strength is less than a predetermined frequency, wherein the processors includes a signal recording circuit and a programmable microprocessor, the signal recording circuit being electrically connected between the sensor and the microprocessor, wherein the signal recording circuit includes:

a peak detection circuit, coupled to the sensor, that stores the highest strength electric signal received during each predetermined time period;

a comparator, coupled to the peak detection circuit, that compares the highest strength electric signal to a threshold level signal during each predetermined time period; and a short term event buffer, coupled to the microprocessor and comparator, having a number of address locations, each address location corresponding to a separate time period and temporarily storing a number representing whether an electric signal having the signal strength greater than the threshold level was received during a corresponding time period.

6. A vigilance monitoring system as claimed in claim 5 wherein the microprocessor is programmed to produce a first output signal if the frequency of received signals having the signal strength is less than a first predetermined frequency and to produce a second output signal if the frequency of received signals having the signal strength is less than a second predetermined frequency.

7. A vigilance monitoring system as claimed in claim 5 wherein the predetermined time period is approximately equal to 250 ms.

8. A vigilance monitoring system comprising:

a sensor, attached to the eyelid of a subject, that produces an electric signal in response to each eyelid movement, wherein the strength of the signal depends on the magnitude of the eyelid movement; and a processor, electrically coupled to the sensor, that monitors the frequency of electric signals received having a signal strength above the threshold level corresponding to a small active eyelid movement, and produces an output signal if the frequency of received electric signals having the signal strength is less than a predetermined frequency, wherein the processors includes a signal recording circuit and a programmable microprocessor, the signal recording circuit being electrically connected between the sensor and the microprocessor, wherein the microprocessor is programmed to produce a first output signal if the frequency of received signals having the signal strength is less than a first predetermined frequency and to produce a second output signal if the frequency of received signals having the signal strength is less than a second predetermined frequency.

9. A method for monitoring vigilance of a subject comprising the steps of:

using a sensor, attached to the eyelid of the subject, to produce an electric signal in response to each eyelid movement, wherein the strength of the signal depends on the magnitude of the eyelid movement;

monitoring the frequency of electric signals produced having a signal strength above a threshold level corresponding to a small active eyelid movement; and producing an output signal if the frequency of produced electric signals having the signal strength is less than a predetermined frequency.

10. The method as claimed in claim 9 wherein the step of using a sensor includes the step of using a piezoelectric sensor.

11. The method as claimed in claim 9 wherein the step of producing an output signal includes producing an audio alarm signal if the frequency of produced electric signals having the signal strength is less than a predetermined frequency.

12. A method for monitoring the vigilance of a subject comprising the steps of:

using a sensor, attached to the eyelid of the subject, to produce an electric signal in response to each eyelid movement, wherein the strength of the signal depends on the magnitude of the eyelid movement;

monitoring the frequency of electric signals produced having a signal strength above a threshold level corresponding to a small active eyelid movement; and producing an output signal if the frequency of produced electric signals having the signal Strength is less than a predetermined frequency, wherein the step of monitoring the frequency of electric signals produced includes the steps of:

storing the highest strength signal produced during each predetermined time period;

comparing the highest strength signal to a threshold level signal during each predetermined time period; and temporarily storing a number in each of a certain number of addressed buffer locations representing whether a signal having the signal strength was produced during a corresponding time period.

13. The method as claimed in claim 12 wherein the step of producing an output signal includes the steps of:

producing a first output signal if the frequency of produced signals having the signal strength is less than a first predetermined frequency; and producing a second output signal if the frequency of produced signals having the signal strength is less than a second predetermined frequency.

14. A method for monitoring the vigilance of a subject comprising the steps of:

using a sensor, attached to the eyelid of the subject, to produce an electric signal in response to each eyelid movement, wherein the strength of the signal depends on the magnitude of the eyelid movement;

monitoring the frequency of electric signals produced having a signal strength above a threshold level corresponding to a small active eyelid movement; and producing an output signal if the frequency of produced electric signals having the signal strength is less than a predetermined frequency, wherein the step of producing an output signal includes the steps of:

producing a first output signal if the frequency of produced signals having the signal strength is less than a first predetermined frequency; and producing a second output signal if the frequency of produced signals having the signal strength is less than a second predetermined frequency.

* * * * *